United States Patent
Fèvre

(10) Patent No.: US 10,520,728 B2
(45) Date of Patent: Dec. 31, 2019

(54) EMBEDDED OPTIMIZATION ALGORITHM OF PARAMETERS TO DRIVE DEPLOYMENT MECHANISM FOR DISPLAYS

(71) Applicant: VISTEON GLOBAL TECHNOLOGIES, INC., Van Buren Township, MI (US)

(72) Inventor: Eric François Fèvre, Villiers-Adam (FR)

(73) Assignee: Visteon Global Technologies, Inc., Van Buren Township, MI (US)

(*) Notice: Subject to any disclaimer, the term of this patent is extended or adjusted under 35 U.S.C. 154(b) by 75 days.

(21) Appl. No.: 15/785,783

(22) Filed: Oct. 17, 2017

(65) Prior Publication Data

US 2019/0113750 A1 Apr. 18, 2019

(51) Int. Cl.
*G02B 27/01* (2006.01)
*G05B 13/04* (2006.01)
(Continued)

(52) U.S. Cl.
CPC ........ *G02B 27/0149* (2013.01); *G02B 27/01* (2013.01); *B60K 2370/1529* (2019.05); *B60R 11/0264* (2013.01); *B60R 2011/0082* (2013.01); *B60R 2011/0085* (2013.01); *G01P 1/04* (2013.01); *G02B 27/0093* (2013.01);
(Continued)

(58) Field of Classification Search
CPC ........ B60R 11/0264; B60R 2011/0082; B60R 2011/0085; G02B 27/01; G02B 27/0093; G02B 2027/014; G02B 27/0149; G02B 2027/0159; G02B 2027/0163; G05B 11/42; G05B 13/04; G05B 13/048; G06F 3/012; G06F 3/013; G09G 2380/10; H02P 8/14; H02P 21/13; H02P 21/14; H02P 21/18; H02P 23/14; H02P 27/045; H02P 29/00

See application file for complete search history.

(56) References Cited

U.S. PATENT DOCUMENTS

| | | | | | |
|---|---|---|---|---|---|
| 4,792,737 A | * | 12/1988 | Goff | ...................... | G05B 13/04 318/560 |
| 5,058,836 A | * | 10/1991 | Nobel | .................... | G05B 13/04 244/164 |

(Continued)

FOREIGN PATENT DOCUMENTS

JP 2014202834 A 10/2014

OTHER PUBLICATIONS

International search report on international application PCT/EP2018/078383.

*Primary Examiner* — Michael J Eurice
(74) *Attorney, Agent, or Firm* — Quinn IP Law

(57) ABSTRACT

A deployment system for a device of a vehicle is described. The deployment system includes a non-transitory computer readable medium to store instructions of the deployment system and a processor configured to execute the instructions. The processor is configured to deploy the device using a parameter, determine a Mean Square Error (MSE), and run a Statistical Process Control (SPC) test on the MSE. The processor is further configured to determine that no special event is present and process a new parameter using the parameter and the SPC test results. An evolutionary operation (EVOP) algorithm is also used to calculate the new parameter.

20 Claims, 4 Drawing Sheets

(51) Int. Cl.
*G05B 11/42* (2006.01)
*H02P 8/14* (2006.01)
*H02P 21/13* (2006.01)
*H02P 21/18* (2016.01)
*H02P 23/14* (2006.01)
*H02P 29/00* (2016.01)
*G01P 1/04* (2006.01)
*B60R 11/00* (2006.01)
*G02B 27/00* (2006.01)
*B60R 11/02* (2006.01)
*G06F 3/01* (2006.01)
*H02P 21/14* (2016.01)
*H02P 27/04* (2016.01)

(52) U.S. Cl.
CPC ............... *G02B 2027/014* (2013.01); *G02B 2027/0159* (2013.01); *G02B 2027/0163* (2013.01); *G05B 11/42* (2013.01); *G05B 13/04* (2013.01); *G05B 13/048* (2013.01); *G06F 3/012* (2013.01); *G06F 3/013* (2013.01); *G09G 2380/10* (2013.01); *H02P 8/14* (2013.01); *H02P 21/13* (2013.01); *H02P 21/14* (2013.01); *H02P 21/18* (2016.02); *H02P 23/14* (2013.01); *H02P 27/045* (2013.01); *H02P 29/00* (2013.01)

(56) References Cited

U.S. PATENT DOCUMENTS

| | | | | |
|---|---|---|---|---|
| 5,204,666 A * | 4/1993 | Aoki | ............... | B60K 37/02 340/980 |
| 5,394,202 A * | 2/1995 | Deering | ............ | G02B 27/0093 353/7 |
| 6,412,848 B1 * | 7/2002 | Ceccanese | ............ | B60K 35/00 224/311 |
| 7,659,685 B2 * | 2/2010 | Cesario | ................ | G05B 13/04 318/568.13 |
| 7,890,263 B2 | 2/2011 | Prakah-Asante et al. | | |
| 9,633,626 B2 * | 4/2017 | Weindorf | ................ | G09G 5/00 |
| 9,709,805 B2 * | 7/2017 | Weindorf | ........... | G02B 27/0101 |
| 2003/0169158 A1 * | 9/2003 | Paul, Jr. | ............. | B60R 11/0235 340/425.5 |
| 2004/0039492 A1 * | 2/2004 | Demontis | ................ | G05G 1/08 701/1 |
| 2004/0088059 A1 * | 5/2004 | Johnson | ............... | G05B 13/027 700/28 |
| 2006/0039736 A1 * | 2/2006 | Ogawa | ................ | B41J 11/42 400/582 |
| 2006/0291066 A1 * | 12/2006 | Shiobara | ............... | B60K 35/00 359/630 |
| 2008/0010875 A1 * | 1/2008 | Kuwabara | .......... | B60R 11/0235 40/424 |
| 2008/0106859 A1 * | 5/2008 | Eguchi | ............... | B60R 11/0235 361/679.21 |
| 2009/0025022 A1 * | 1/2009 | Blatchley | .............. | H04H 60/33 725/9 |
| 2009/0033259 A1 * | 2/2009 | Cesario | ................ | G05B 13/04 318/400.04 |
| 2010/0052581 A1 * | 3/2010 | Izumi | ...................... | B60K 6/48 318/400.04 |
| 2010/0176914 A1 * | 7/2010 | Moraes | ................ | B60K 35/00 340/3.1 |
| 2010/0253489 A1 * | 10/2010 | Cui | ...................... | G01S 13/723 340/425.5 |
| 2010/0253492 A1 * | 10/2010 | Seder | .................... | G01S 13/723 340/435 |
| 2010/0253493 A1 * | 10/2010 | Szczerba | ................ | G01S 13/723 340/435 |
| 2011/0040455 A1 * | 2/2011 | Lathrop | ................ | B60K 35/00 701/48 |
| 2011/0050142 A1 * | 3/2011 | Lu | ........................... | H02P 23/14 318/461 |
| 2012/0001582 A1 * | 1/2012 | Park | ..................... | G05B 13/048 318/610 |
| 2012/0283894 A1 * | 11/2012 | Naboulsi | ............. | B60R 11/0264 701/1 |
| 2013/0050112 A1 * | 2/2013 | Vanhelle | ................ | B60K 37/06 345/173 |
| 2013/0060354 A1 * | 3/2013 | Choi | ................ | G05B 19/41875 700/51 |
| 2014/0137326 A1 * | 5/2014 | Tavanti | .............. | H05B 37/0245 5/601 |
| 2014/0267775 A1 * | 9/2014 | Lablans | .................. | H04N 5/247 348/169 |
| 2015/0355464 A1 * | 12/2015 | Hopf | ................... | G02B 27/0149 359/632 |
| 2016/0041386 A1 * | 2/2016 | Rodriguez Moreno | ...................... | G02B 27/0101 345/7 |
| 2016/0154238 A1 * | 6/2016 | Weindorf | ........... | G02B 27/0101 359/630 |
| 2016/0162145 A1 * | 6/2016 | Rivers | ................. | G01S 13/9307 715/769 |
| 2016/0226414 A1 * | 8/2016 | Wang | ...................... | H02P 21/18 |
| 2017/0285739 A1 * | 10/2017 | Aaron | ...................... | G06F 3/013 |
| 2017/0323458 A1 * | 11/2017 | Lablans | ................ | G01S 19/48 |
| 2017/0349069 A1 * | 12/2017 | Helot | ...................... | B60N 2/02 |
| 2018/0111599 A1 * | 4/2018 | Wang | ...................... | B60W 20/13 |
| 2018/0328294 A1 * | 11/2018 | Levijoki | ................ | F02D 41/0002 |

\* cited by examiner

EMBEDDED OPTIMIZATION ALGORITHM OF PARAMETERS TO DRIVE DEPLOYMENT MECHANISM FOR DISPLAYS

BACKGROUND

Vehicles include devices, such as displays or head-up displays (HUDs), which are repositioned for different occupants. Such deployment of these devices causes the mechanical components of the devices to wear out. There is a need for a smart system with a deployment mechanism for deploying the device to a new position, and continuously improving the deployment while taking into account potential interactions with the device environment (e.g. mechanical constraints, vibrations, etc.) and discrepancies between target and actual parameters of the device. This system would also account for manufacturing variations of such devices.

SUMMARY

This section provides a general summary of the present disclosure and is not a comprehensive disclosure of its full scope or all of its features, aspects, and objectives.

Disclosed herein are implementations of a deployment system for a device. The deployment system includes a non-transitory computer readable medium to store instructions of the deployment system and a processor configured to execute the instructions. The processor is configured to deploy the device using one or more parameters, determine a Mean Square terror (MSE) of the system response versus target, and run a Statistical Process Control (SPC) test on the MSE. The processor is further configured to determine that no special event is present and adjust the one or more parameters.

Also disclosed herein are implementations of a deployment system for a vehicle having a microprocessor, a sensor, and a head-up display (HUD). The microprocessor is configured to execute instructions stored on a non-transitory computer readable medium. The sensor is coupled to the microprocessor and configured to receive information of surroundings of the deployment system. The HUD is coupled to the microprocessor. The microprocessor is further configured to initiate a target response for an occupant of the vehicle and deploy the HUD using the target response. The microprocessor is further configured to measure a real-time response of the HUD during deployment and compute a Mean Square Error (MSE) using the target response and the real-time response. The microprocessor then determines using a EVOP algorithm the new parameters for deployment of the HUD using the MSE and recorded parameters and responses from previous iterations.

Also disclosed herein are implementations of a method for deploying a display. The method includes performing deployment using one or more parameters, determining a Mean Square Error (MSE), and running a Statistical Process Control (SPC) test on the MSE. The method further includes determining that no special event is present and processing new parameters using historical data, the MSE, and the SPC test results.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following description is merely exemplary in nature and is not intended to limit the disclosure in its application or uses. For purposes of clarity, the same reference numbers are used in the description and drawings to identify similar elements.

Figure 1:
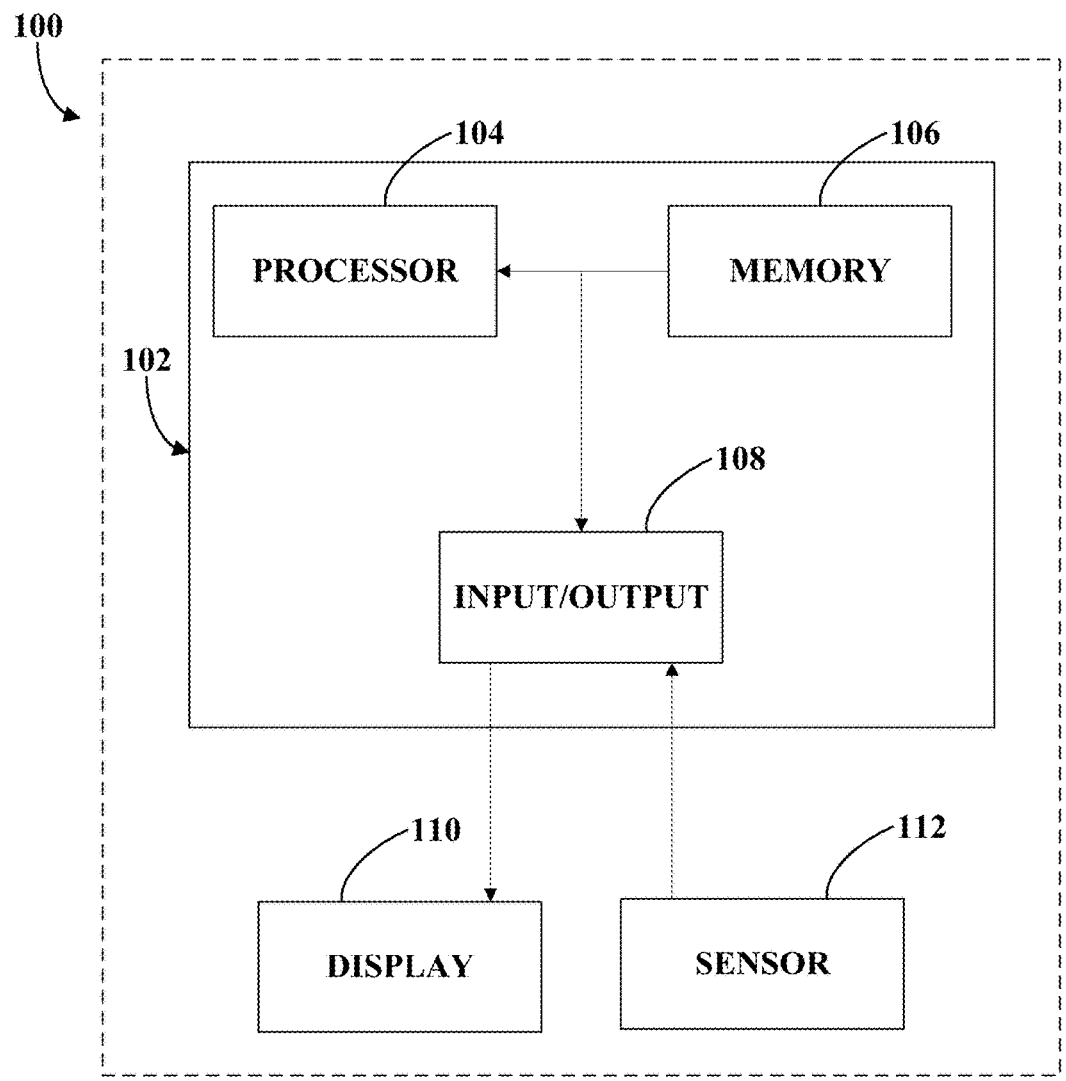
FIG. 1 is a simplified block diagram depicting exemplary components of the system in accordance with one aspect of the present disclosure.

FIG. 1 is an illustrative block diagram depicting exemplary components of the system 100 in accordance with one aspect of the present disclosure. The system 100 may include additional and/or fewer components and is not limited to those illustrated in FIG. 1. The system 100 includes a control unit 102. The control unit 102 includes various components such as at least one microprocessor or processor 104, a memory 106, and an input/output 108. The control unit 102 may process the data captured by the sensor 112 to identify the environment surrounding the system 100, or more particularly of the display 110. The sensor 112 may capture the actual position and/or speed of the display 110. The control unit 102 may process the actual position and/or speed of the display 110 within that environment. The control unit 102 processes data of the environment, like mechanical constraints or vibration that are captured by the sensor 111 The memory 106 stores data of the positions of the display 110. Using the record of previous positions of the display 110 and a new set of parameters, the processor 104 provides the new parameters to the display 110 to drive the deployment mechanism for the display 110.

The processor 104 is a device that processes signals and performs general computing and arithmetic functions. The processor 104 may include multiple single and multicore processors, co-processors, and architectures. The memory 106 may include a variety of memory, such as volatile memory and non-volatile memory. The memory 106 may also include a disk, such as but not limited to a flash memory card, a memory stick, a magnetic disk drive, a solid state disk drive, a CR-ROM, or a DVD ROM. The memory 106 may store a system that controls resources of a computing device and software that the processor 104 executes. The processor 104 and memory 106 are operatively coupled. The processor 104 performs processes by executing software instructions stored by the memory 106. The processes may include capturing data of the environment surrounding the display 110. The processes may include capturing data of the actual speed when the display 110 is deploying and the actual position of the display 110. The processes may also include determining the angle of the display 110. The processes may further include computing a metric measuring a Mean Square Error (MSE) while the display 110 is deploying. The processes may also include calculating the parameters for the next deploy of the display 110, which improves the processes.

The processor 104 and the memory 106 communicate through the input/output 108. The input/output 108 is a part of the system 100 and communicates with the sensor 112 and the display 110. The data captured by the sensor 112 is input to processor 104 for processing and outputting to the display 110 for providing display deployment assistance to optimize the position of the display 110 for an occupant of a vehicle.

The memory 106 stores an optimization algorithm having software parameters to drive a deployment mechanism for the display 110. The optimization algorithm is embedded in the software of the display 110. The embedded optimization algorithm may be used with any mechanism that deploys the display 110. The position of the display 110 may be captured in actual time and stored in the memory 106. The speed of the display 110 as it deploys may be measured in actual time and stored in the memory 106. The display 110 includes the deployment mechanism for deploying the display 110. Each time the deployment mechanism is used in the vehicle for deploying the display 110 to a new position, a new set of software parameters is tested. Small variations of the system response are detected by sensor 112. The small variations may be undetectable by the occupant. The processor 104 computes a metric measuring the MSE during this deployment. Using the result and the record of previous deploys, together with using an Evolutionary Operation (EVOP) algorithm and a Statistical Process Control (SPC), the processor 104 calculates the parameters for the next deploy of the display 110. The embedded optimization algorithm is continuously improving the metric and the parameters to provide optimal performance to the occupant during the lifecycle of the display 110. The optimal performance reduces the wear of the deployment mechanism, because the wear of the mechanical components of the deployment mechanism are dynamically compensated by the embedded optimization algorithm. Furthermore, each time the display 110 is deployed, the embedded optimization algorithm measures the performance of the display 110 for evolutionary optimization.

The optimization algorithm can be embedded into a variety of devices. The embedded optimization algorithm includes an initial parameter setting, such as a set point (SP). The parameters may include PID coefficients (e.g. proportional, integral, and/or derivative coefficients) The parameters change using the particular device and the embedded optimization algorithm will evolve to find the device's particular optimum parameters (e.g. process variables (PV)). The embedded optimization algorithm also accounts for potential interactions of the device with the environment, for example, mechanical constraints and vibration. The embedded optimization algorithm computes these influences and adapts continuously to the environment.

Figure 2:
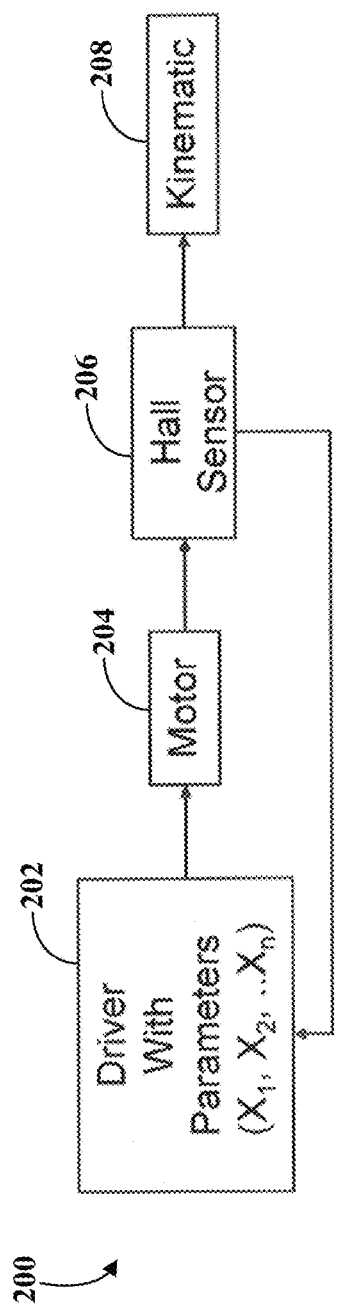
FIG. 2 is a flow chart illustrating an exemplary process of the system in accordance with one aspect of the present disclosure.

FIG. 2 illustrates an exemplary process 200 of the system 100. Step 202 includes at least one parameter of an occupant or driver of a vehicle. The parameters can be identified by $x_1$, $x_2$, ... $x_n$. Using the parameters, at step 204, the processor 104 provides instructions to a deployment mechanism, such as a motor. For example, the embedded optimization algorithm uses the parameters $x_1$, $x_2$, ... $x_n$ to drive the motor for deployment of the display 110. Each parameter has initial values and boundaries that define the design space for optimizing the deployment. At step 206, the sensor 112, such as a Hall sensor, is used to capture position and/or speed of the display 110. If the sensor captures data that changes the parameters, the values and boundaries defined may also change. Process 200 may continue to step 202 and evaluate the parameters and continue the process. Process 200 may continue to step 208 to drive the motor to deploy the display 110. The embedded optimization algorithm modifies the parameters driving the deployment device so that process 200 provides smooth, precise, and repeatable deployments of the display 110.

Figure 3:
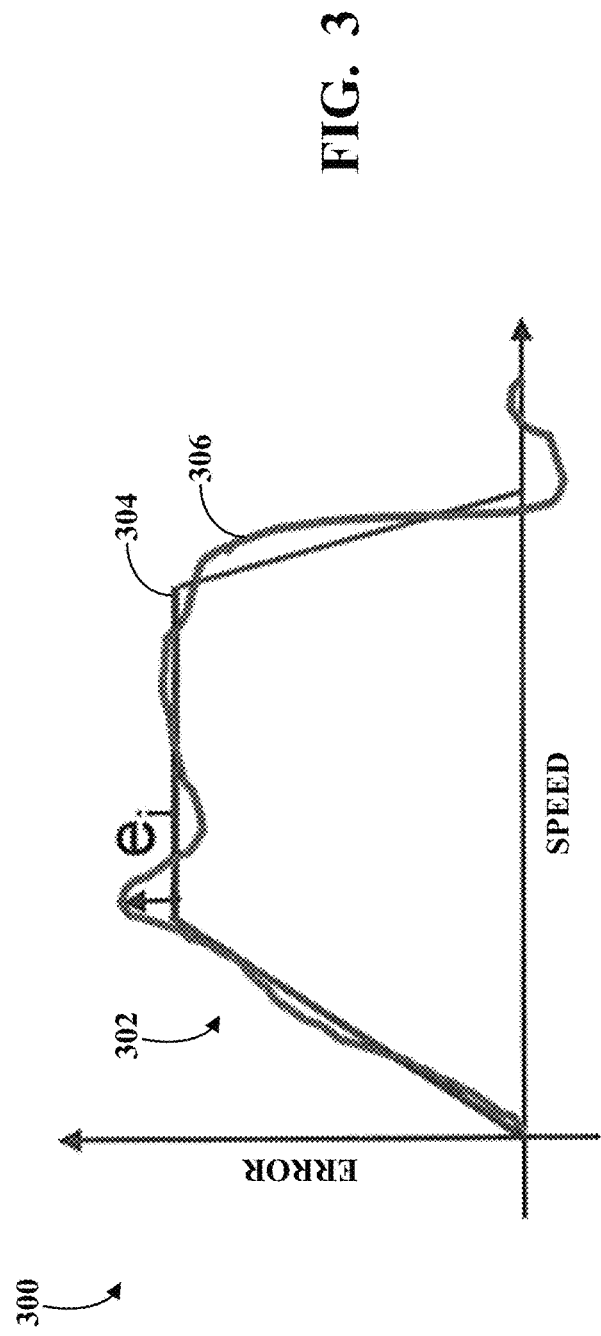
FIG. 3 is a graph of a target speed and a measured speed of a display in accordance with one aspect of the present disclosure.

FIG. 3 illustrates a graph 300 of a speed profile 302 of the display 110, including a target speed 304 and a measured speed 306. At each time interrupt, the processor 104 calculates an error $e_i$ between the target speed 304 and the measured speed 306. For each deployment j of the display 110, such as a head-up display (HUD), the processor 104 calculates the MSE of the target speed 304 and the measured speed 306. The parameters $x_1(j)$, $x_2(j)$, .... $x_n(j)$ include a response MSE(j). The equation for this calculation is as follows:

$$MSE = \frac{\sum e_i^2}{df}$$

Figure 4:
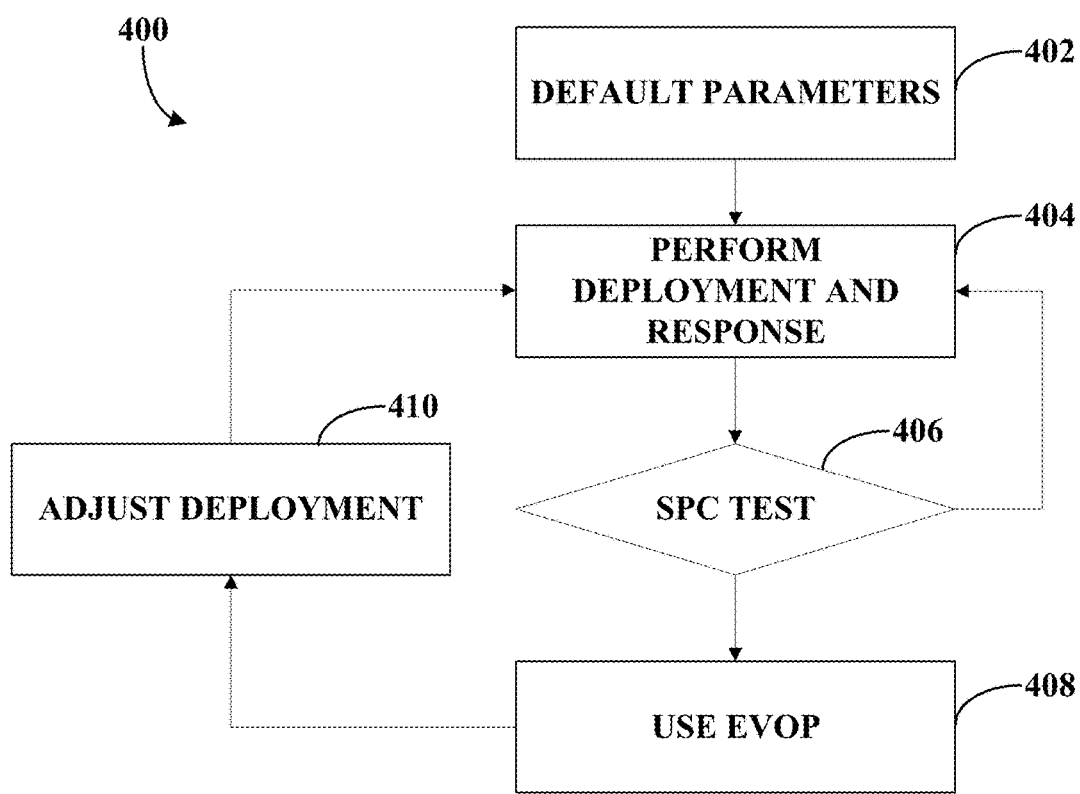
FIG. 4 is a flow chart illustrating an exemplary process of the system in accordance with one aspect of the present disclosure.

FIG. 4 illustrates an exemplary process 400 of the embedded optimization algorithm of the system 100. Process 400 begins with establishing the default parameters at step 402. The parameters are identified by $x_1(0)$, $x_2(0)$, ... $x_n(0)$. After the default parameters are established, process 400 proceeds to step 404. At step 404, deployment j with parameters $x_1(j)$, $x_2(j)$, ... $x_n(j)$ are performed. The processor 104 calculates a response MSE(j), the MSE is the sum of the square of a speed error or a position error at each period divided by one less than the number of period. At step 406, a SPC test is run on the response MSE(j) using an exponentially weighted moving average (EWMA) method. The EWMA method uses a type of infinite impulse response filter that applies weighting factors which decrease exponentially. The weighting for each older datum decreases exponentially without reaching zero.

The SPC is used on the MSE to determine if a special event occurred during the deployment of the display 110. If a special event occurred during deployment, the last result is discarded. In other words, if the response MSE(j) is out of control, there is a special event and process 400 returns to step 404 to redo the deployment j. If the response MSE(j) is in control, meaning that there is no special event, process 400 proceeds to step 408. At step 408, a EVOP algorithm is used to calculate $x_j(j+1)$, $x_2(j+1)$, ... $x_n(j+1)$ using a previous n+1 in the control results. At step 410, the deployment j is adjusted to j+1. The parameters from the last n+1 records and the corresponding measures of the MSE are recorded and stored in memory 106. After deployment j is adjusted, process 400 proceeds to step 404 to perform the deployment j and the response. Process 400 continues until it stops. Process 400 may stop when the vehicle is turned off or after a period of time, and resume when the vehicle is turned on.

Figure 5:
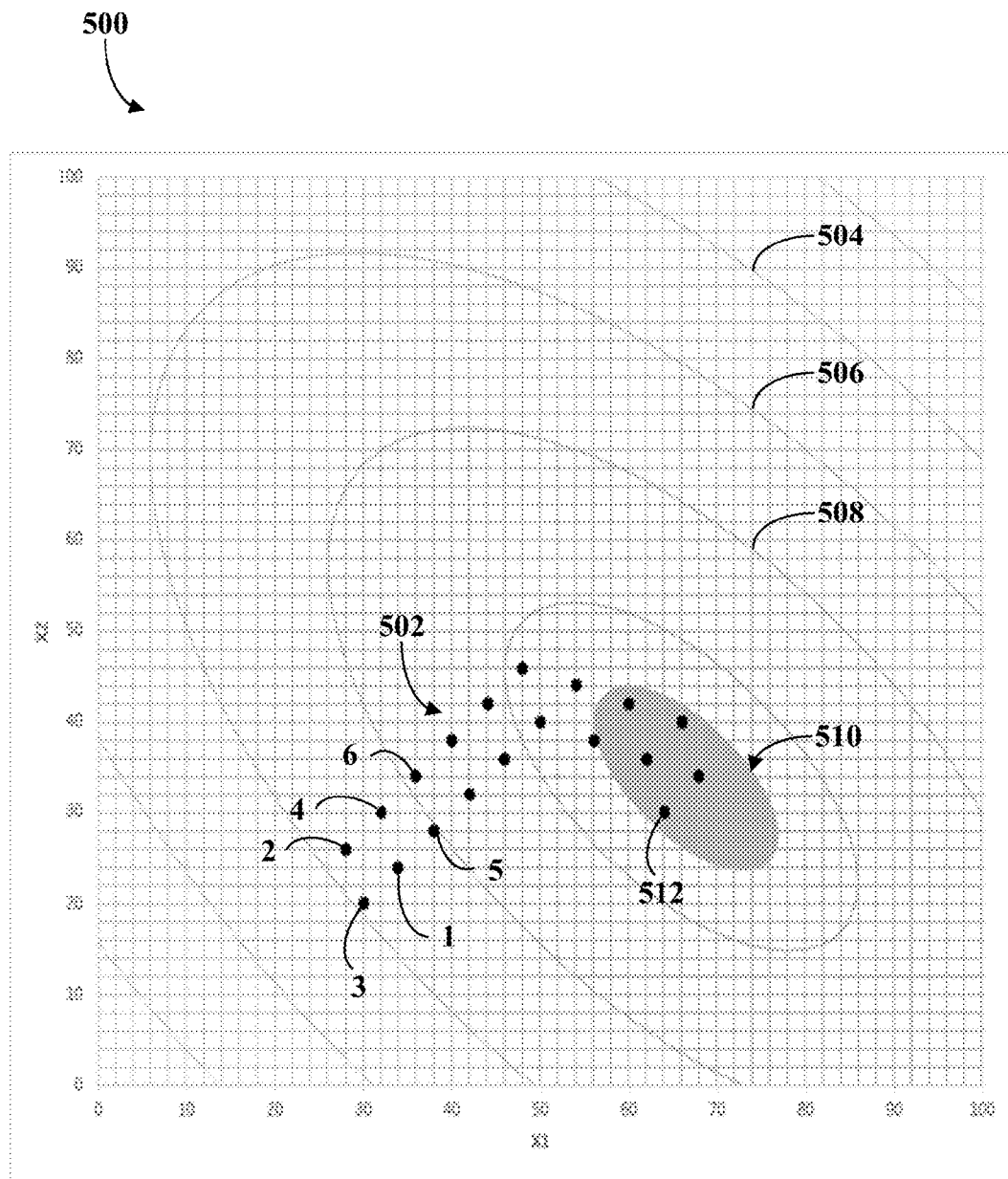
FIG. 5 is a graph of an Evolutionary Operation (EVOP) algorithm in accordance with one aspect of the present disclosure.

FIG. 5 illustrates a graph 500 of an evolutionary operation, or EVOP 502, of the system 100. In this embodiment, the EVOP 502 has two parameters X1 and X2. Each vertex, for example vertex 1-6, is represented by a dot on the graph 50. Vertex 1, 2, 3 are the initial vertexes. The value of X1 and X2 may be adjusted from 0 to 100. The curves, for example curves 504, 506, 508, represent a contour plot of the MSE. During the first three moves, e.g. from vertex 1 to vertex 2 to vertex 3, the MSE is calculated for each of the three vertexes. After the MSE is calculated, the vertex moves toward an optimal area 510 for the particular device having the embedded optimization algorithm. When a vertex (e.g. vertex 512) reaches the optimal area 510, the vertex 512 oscillates around the optimal area 510 until a condition changes. For example, if wear on the deployment mechanism or another influence is detected, the system behavior changes and the optimal area 510 will move to a more optimal area. In other words, the embedded optimization algorithm will adapt and the vertex will move to a new optimal area.

The new set of parameters (e.g., the vertex) is calculated using the valid last n+1 deployments using EVOP 502. In another embodiment, a different variant of EVOP 502 is used. For example, using a variable of fixed step size. One implementation of EVOP 502 is to 1) rank the MSE and 2) obtain a new vertex. For step 1, a Vertex W is the vertex with a higher MSE and a Vertex_G is the mean of all other vertexes. For step 2, the new vertex is calculated as follows: New Vertex=2*Vertex_G−Vertex_W. Basically, optimal parameters are determined and implemented as static parameters. To dynamically adapt to a change of the device, the records of the MSE are refreshed. For example, records of the MSE older than 100 deploys or one month are actualized. The EVOP 502 may include additional and/or fewer steps and is not limited to those illustrated ifs this disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A deployment system for a display of a vehicle, comprising:
   a non-transitory computer readable medium to store instructions of the deployment system; and
   a processor configured to execute the instructions, the processor being configured to:
   deploy the display using a parameter, wherein the parameter includes at least a deployment speed of the display;
   determine a Mean Square Error (MSE);
   run a Statistical Process Control (SPC) test on the MSE, wherein the SPC test run on the MSE includes using an exponentially weighted moving average (EWMA) method to generate SPC test results;
   determine that no special event is present based upon the SPC test results on the MSE; and
   process a new parameter using the parameter and the SPC test results to deploy the display using the new parameter.

2. The deployment system of claim 1, wherein the processor is further configured to:
   determine that a special event is present based upon the SPC test results on the MSE; and
   repeat deployment of the display using the parameter.

3. The deployment system of claim 1, wherein the processor is further configured to:
   initiate a default parameter;
   deploy the display using the default parameter; and
   process the new parameter using the default parameter and the SPC test results to deploy the display using the new parameter.

4. The deployment system of claim 1, wherein processing the new parameter using the parameter and the SPC test results includes using an evolutionary operation (EVOP) algorithm to calculate the new parameter.

5. The deployment system of claim 1, wherein the display is a head-up display (HUD).

6. The deployment system of claim 1, wherein the deployment mechanism further comprises a motor for deploying the display.

7. The deployment system of claim 1, further comprising:
   a sensor to capture at least one of an actual speed of deploying the display and an actual position of the display.

8. The deployment system of claim 7, wherein the processor is further configured to determine the MSE using at least one of the actual speed of deploying the display versus a target speed of deploying the display and the actual position of the display versus a target position of the display.

9. A deployment system for a display of a vehicle, comprising:
   a microprocessor coupled to the display, the microprocessor being configured to execute instructions stored on a non-transitory computer readable medium; and
   a sensor coupled to the microprocessor and configured to identify the environment surrounding the deployment system;
   wherein the microprocessor is further configured to:
   initiate a target parameter for deployment of the display to optimize the position of the display for an occupant of the vehicle, wherein the target parameter includes at least a target speed of the display;
   deploy the display using the target parameter;
   measure an actual parameter of the display during deployment wherein the actual parameter includes at least an actual speed of the display;
   compute a Mean Square Error (MSE) using the target parameter and the actual parameter; and
   determine a new parameter for deployment of the display using the MSE,
   wherein the microprocessor is further configured to use an evolutionary operation (EVOP) algorithm and a Statistical Process Control (SPC) test to determine the new parameter.

10. The deployment system of claim 9, wherein the actual parameter further comprises at least one of the actual speed of the display and the actual position of the display.

11. The deployment system of claim 9, wherein the identification of the environment surrounding the deployment system includes identification of at least one of mechanical constraints and vibrations of the display.

12. The deployment system of claim 9, wherein the deployment mechanism further comprises a motor for deploying the display.

13. The deployment system of claim 9, wherein the processor is further configured to determine the MSE using at least one of the actual speed of deploying the display versus a target speed of deploying the display and the actual position of the display versus a target position of the display.

14. A method for deploying a display, comprising:
   performing deployment of the display using a parameter, wherein the parameter includes at least a speed of deployment of the display;
   determining a Mean Square Error (MSE);
   running a Statistical Process Control (SPC) test on the MSE to generate SPC test results;
   determining that no special event is present based upon the SPC test results on the MSE; and processing a new parameter for deploying the display using the parameter and the SPC test results.

15. The method of claim 14, wherein the running the SPC test on the MSE includes using an exponentially weighted moving average (EWMA) method.

16. The method of claim 14, further comprising:
determining that a special event is present; and
repeating deployment of the display using the parameter and the SPC test results on the MSE.

17. The method of claim 14, further comprising:
initiating a default parameter, wherein the default parameter includes at least one of a target speed of the display and a target position of the display;
performing deployment of the display using the default parameter; and
processing the new parameter for deploying the display using the default parameter and the SPC test results on the MSE.

18. The method of claim 14, wherein processing a new parameter for deploying the display using the parameter and the SPC test results includes using an evolutionary operation (EVOP) algorithm to calculate the new parameter.

19. The method of claim 14, wherein determining the MSE calculates an actual speed of deploying the display versus a target speed of deploying the display.

20. The method of claim 14, wherein determining the MSE calculates an actual position of the display versus a target position of deploying the display.

* * * * *